United States Patent [19]

Ishikawa et al.

[11] Patent Number: 5,159,237
[45] Date of Patent: Oct. 27, 1992

[54] GREEN-LIGHT-EMITTING RARE GAS DISCHARGE LAMP

[75] Inventors: Kazutoshi Ishikawa; Katsuo Murakami; Seishiro Mitsuhashi; Takashi Osawa; Yujiro Kamano; Yoshinori Anzai; Takeo Saikatsu; Hiromi Adachi, all of Kanagawa, Japan

[73] Assignee: Mitsubishi Denki Kabushiki Kaisha, Tokyo, Japan

[21] Appl. No.: 696,271

[22] Filed: May 1, 1991

Related U.S. Application Data

[63] Continuation of Ser. No. 337,526, filed as PCT/JP88/00798, Aug. 9, 1988, abandoned.

[30] Foreign Application Priority Data

Aug. 10, 1987 [JP] Japan .................. 62-199360
Feb. 10, 1988 [JP] Japan .................. 63-29351

[51] Int. Cl.⁵ .................. H01J 1/62
[52] U.S. Cl. .................. 313/486; 313/643
[58] Field of Search .................. 313/486, 643; 252/301.4 F, 301.4

[56] References Cited

U.S. PATENT DOCUMENTS

| | | | |
|---|---|---|---|
| 2,622,221 | 12/1952 | Beese | 313/486 |
| 3,536,945 | 10/1970 | Skirvin | 313/643 X |
| 3,758,413 | 9/1973 | Peters | 252/301.4 F |
| 4,000,436 | 12/1976 | Toryu et al. | 313/487 |
| 4,208,611 | 6/1980 | Watanabe et al. | 313/487 |
| 4,798,768 | 1/1989 | Overslvizen et al. | 252/301.4 R |
| 4,874,984 | 10/1989 | Sigin et al. | 313/486 |

FOREIGN PATENT DOCUMENTS

| | | |
|---|---|---|
| 0037688 | 10/1981 | European Pat. Off. |
| 0206393 | 12/1986 | European Pat. Off. |
| 50-38264 | 12/1975 | Japan |
| 58-119151 | 7/1983 | Japan |
| 58-119152 | 7/1983 | Japan |
| 2260885 | 4/1987 | Japan ............ 252/301.4 F |
| 1-200549 | 8/1989 | Japan |

OTHER PUBLICATIONS

William L. Lama et al., "Rare Gas Fluorescent Lamp for Reproduction Device", Xerox Disclosure Journal, vol. 8, No. 3, May/Jun. 1983, p. 269.
6001 Chemical Abstracts, vol. 96 (1982), May, No. 18, Columbus, Ohio.
English language abstract of Japanese Publication No. 56-167783, Apr. 1982.
English language abstract of Japanese Publication No. 56-84859, Jul. 1981.

Primary Examiner—Donald J. Yusko
Assistant Examiner—Michael Horabik
Attorney, Agent, or Firm—Burns, Doane, Swecker & Mathis

[57] ABSTRACT

A green-light-emitting rare gas discharge lamp includes a glass tube filled with at least one selected from the group consisting of xenon, neon, helium, argon and krypton as a rare gas capable of emitting vacuum ultraviolet rays of a wavelength of not more than 200 nm, and includes on an inner surface of the glass tube a layer of a green-light-emitting phosphor having terbium-activated yttrium silicate, whereby it is intended to obtain enhanced performance as a green-light-emitting light source and to put the discharge lamp to practical use as a green-light-emitting light source for office automation equipment, for instance.

12 Claims, 4 Drawing Sheets

GREEN-LIGHT-EMITTING RARE GAS DISCHARGE LAMP

This application is a continuation of application Ser. No. 07/337,526, filed as PCT/JP88/00798, Aug. 9, 1988, now abandoned.

FIELD OF THE INVENTION

This invention relates to a rare gas discharge lamp which emits green light.

DESCRIPTION OF THE PRIOR ART

In recent years there has been a demand for a green-light-emitting light source as a light source for office automation equipment such as facsimiles, and there have been known low-pressure rare gas discharge lamps which meet the demand.

The low-pressure rare gas discharge lamps suffer less deterioration and less temperature dependency of luminous intensity during lighting, as compared with general fluorescent lamps filled with mercury, and are capable of instantaneous lighting. The low-pressure rare gas discharge lamps, however, are inferior to the general fluorescent lamps in brightness (luminance) and chromaticity, and are therefore not in wide use at present as light sources for general illumination.

However, the performance and characteristics of the low-pressure rare gas discharge lamps have been reconsidered from the viewpoint of use thereof as light sources for office automation equipment. On the other hand, there has been a keen request for technical developments for enhancing the performance of the low-pressure rare gas discharge lamps in respect of brightness and chromaticity.

Examples of the prior art developed to meet the request include the following ones (i) to (iv).

(i) Japanese Patent Publication Nos. 58-119151 (1983) and 58-119152 (1983) disclose, as red light sources, low-pressure rare gas discharge lamps in which discharge containers are filled with a mixed gas of neon and argon or a mixed gas of neon and krypton and which, by high-frequency lighting, are capable of electric discharge free of moving striation at small currents.

The discharge lamps disclosed in the publications merely use the rare gases only and, therefore, the lamps are not yet satisfactory in brightness and chromaticity. Thus, only red lamps utilizing the neon light emission have been put to practical use.

(ii) Xerox Disclosure Journal, Vol. 8, No. May/June 1983 discloses, on page 269, as a green light source, a rare gas discharge lamp in which at least one of neon and xenon is used and in which $ZnSiO_4$:Mn is used as a light-emitting medium.

In this literature, however, only a gas discharge light-emitting element using a blue-light-emitting phosphor activated with cerium or bivalent europium is disclosed, and nothing is disclosed as to high-efficiency green-light-emitting rare gas discharge lamps. As the green-light-emitting phosphor, only $Zn_2SiO_4$:Mn is disclosed in this literature.

(iii) Japanese Patent Publication No. 53-42389 (1978) discloses several green-light-emitting phosphors having a high excitation spectrum at a wavelength of not longer than 200 nm in vacuum ultraviolet excitation spectra.

Of the phosphors having an excitation spectrum in a vacuum ultraviolet region of wavelengths of not more than 200 nm, however, few have been put to practical use, and only $Zn_2SiO_4$:Mn has been used as a green-light-emitting phosphor, with extreme unsatisfaction.

(iv) Japanese Patent Publication No. 48-37670 (1973) discloses green and red-light-emitting phosphors which are represented by the general formula $XLn_2O_3 \cdot YSiO_2$:$ZL'n$ (where, Ln is lanthanum, yttrium or a mixture thereof, L'n is terbium, europium or a mixture thereof, the ratio X/Y is in the range from 0.25/1 to 1/1, and the ratio Z/Y is in the range from 0.005/1 to 0.4/1) and which are excited at a mercury resonance line of 254 nm or 365 nm.

This publication discloses a terbium-activated lanthanum silicate as a green-light-emitting phosphor excited by the mercury resonance line of 254 nm or 365 nm as mentioned above. The publication, however, does not disclose anything as to the excitation characteristics in a vacuum ultraviolet region and the light emission characteristics; therefore, there are problems as to the characteristics. Besides, the lamps utilizing the mercury resonance line shows heavy temperature dependency of luminance when used as a light source for office automation equipment, and has a problem with respect to instantaneous lighting. Thus, it has been impossible to put such lamps into practical use as light sources for office automation equipment.

As has been described above, none of the prior art makes it possible to fulfill the performance characteristics such as luminance and chromaticity while maintaining the lamp characteristics of less deterioration and less temperature dependency of luminous intensity during lighting as well as capability of instantaneous lighting. Therefore, the lamps according to the prior art involve many practical problems, such as incapability of being used as high-performance green-light-emitting light sources for office automation equipment.

DISCLOSURE OF THE INVENTION

It is an object of this invention to obtain a green-light-emitting rare gas discharge lamp which causes a specified green-light-emitting phosphor to emit light by ultraviolet rays emitted from a rare gas and which is enhanced in luminous efficacy while maintaining the characteristic features of rare gas discharge, such as less deterioration and less temperature dependency of luminous intensity during lighting as well as capability of instantaneous lighting, to be thereby practicable as a high-performance green-light-emitting light source for office automation equipment, for instance.

In order to attain the above object, the green-light-emitting rare gas discharge lamp according to this invention comprises a glass tube, as a discharge container, filled with a rare gas including at least one of xenon, neon, helium, argon and krypton, and a layer of a green-light-emitting phosphor comprising terbium-activated yttrium silicate on an inner surface of the glass tube, as means for converting vacuum ultraviolet rays of a wavelength of not longer than 200 nm emitted from the rare gas into visible radiation.

The green-light-emitting phosphor layer is more effective when the layer comprises at least one selected from the group consisting of boron, aluminum, phosphorus, scandium and the lanthanum series elements.

Since green-light-emitting rare gas discharge lamp of this invention comprises the above-mentioned components, the vacuum ultraviolet rays of a wavelength of not longer than 200 nm emitted from the rare gas comprising at least one of xenon, neon, argon, helium and krypton excites the green-light-emitting phosphor comprising the terbium-activated yttrium silicate, whereby green-light-emission with a main peak at 543 nm is obtained, and a 40 to 50% improvement in luminance is achieved, as compared with the case of using $Zn_2SiO_4:Mn$ according to the prior art.

Moreover, when the green-light-emitting phosphor layer of the terbium-activated yttrium silicate comprises at least one selected from the group consisting of boron, aluminum, phosphorus, scandium and the lanthanum series elements, a further improvement in the radiant efficiency upon excitation by vacuum ultraviolet rays of a wavelength of not longer than 200 nm is achievable.

BEST MODE FOR CARRYING OUT THE INVENTION

Example 1

An inner peripheral surface of a glass tube 15 mm in outside diameter and 285 mm in length was coated with a layer of a green-light-emitting phosphor comprising terbium-activated yttrium silicate having a composition of $(Y_{0.93}Tb_{0.07})_2SiO_5$, electrodes were fitted to both ends of the glass tube in a sealing manner, and the glass tube was filled with a mixed gas of neon and xenon at a pressure of 0.5 to 10 Torr, to produce a lamp. The characteristics of the lamp were examined by various experiments.

Table 1 shows the experimental results, specifically the lamp characteristics when the neon-xenon mixing ratio and the pressure of the gas filling the glass tube were varied.

Figure 1:
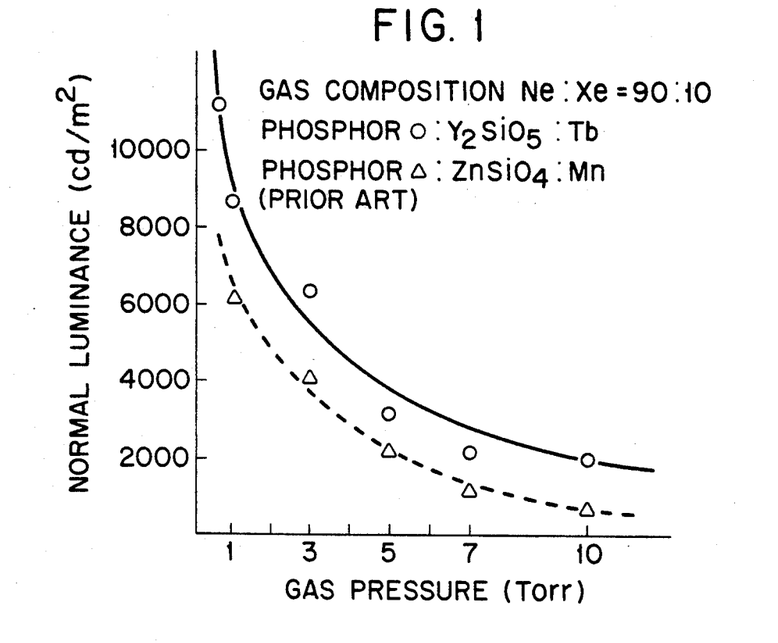
FIG. 1 is a diagram showing the relationship between gas pressure and normal luminance in the case of using $Y_2SiO_5:Tb$ and $ZnSiO_4:Mn$.
Figure 2:
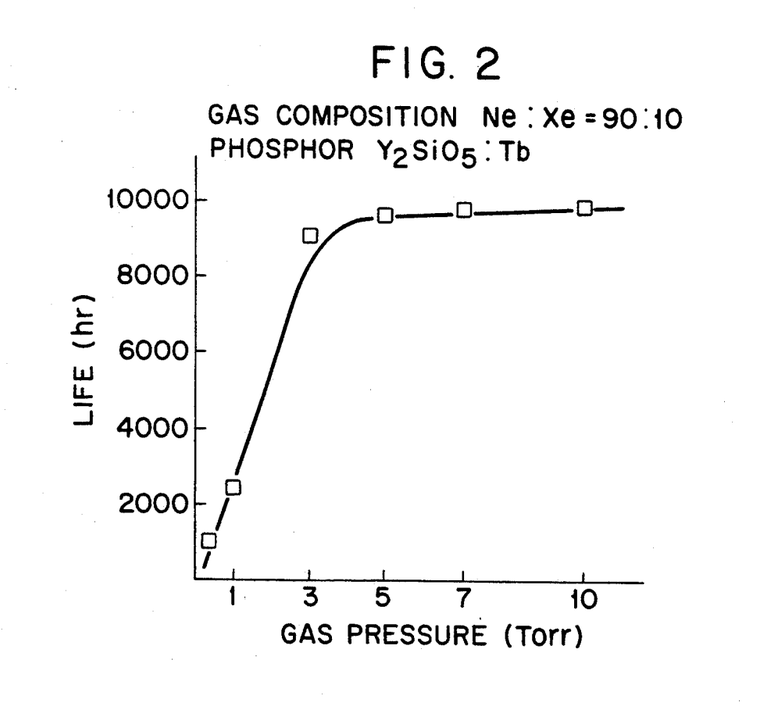
FIG. 2 is a diagram showing the relationship between gas pressure and life in the case where the gas composition is fixed at Ne:Xe=90:10.

FIG. 1 shows the relationship between gas pressure and normal luminance, i.e., variation of normal luminance with gas pressure, in the case of using a green-light-emitting phosphor layer comprising terbium-activated yttrium silicate and in the case of using a manganese-activated zinc silicate phosphor, whereas FIG. 2 shows the relationship of life to gas pressure.

As shown in Table 1 and FIG. 1, a lamp filled with a mixed gas of 90% neon and 10% xenon at a pressure of 3 Torr had a normal luminance of 6,150 cd/m², which is 1.5 times the luminance obtained by using a conventional $ZnSiO_4:Mn$ phosphor, and the life of the lamps was 9,300 hours, as shown in FIG. 2.

Figure 3:
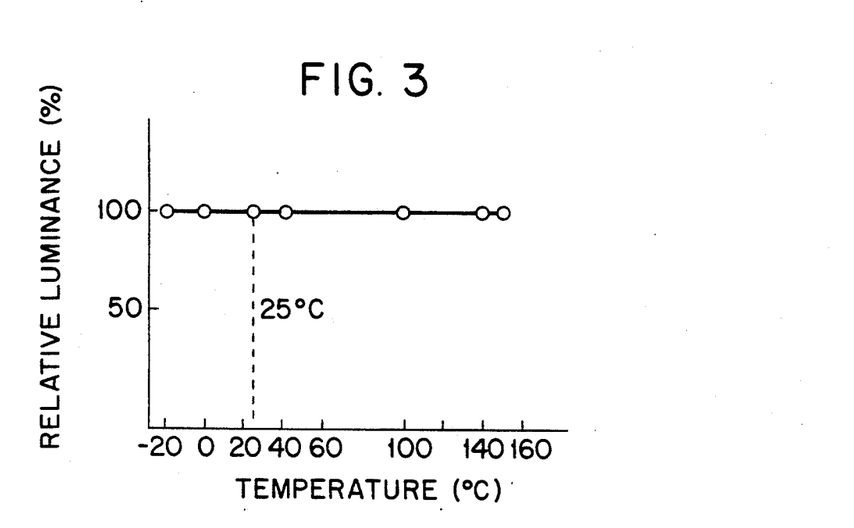
FIG. 3 is a diagram showing the temperature-luminance characteristic relationship in this invention.

Besides, as is clear from FIG. 3 which shows the temperature-luminance characteristics, the experimental results revealed extremely favorable luminance-temperature characteristic of the lamp at temperatures down to −20° C.

TABLE 1

| No. | Gas composition [%] Ne | Xe | Gas pressure (Torr) | Normal luminance (cd/m²) |
| --- | --- | --- | --- | --- |
| 1 | 99 | 1 | 0.5 | 15,200 |
| 2 | | | 1 | 11,480 |
| 3 | | | 3 | 8,200 |
| 4 | | | 5 | 4,130 |
| 5 | | | 10 | 1,450 |
| 6 | 95 | 5 | 0.5 | 15,000 |
| 7 | | | 1 | 11,060 |
| 8 | | | 3 | 7,960 |
| 9 | | | 5 | 4,010 |
| 10 | | | 10 | 1,300 |
| 11 | 90 | 10 | 0.5 | 12,000 |
| 12 | | | 1 | 8,630 |
| 13 | | | 3 | 6,150 |
| 14 | | | 5 | 3,090 |
| 15 | | | 10 | 1,990 |
| 16 | 50 | 50 | 0.5 | 3,040 |
| 17 | | | 1 | 2,100 |
| 18 | | | 3 | 1,500 |
| 19 | | | 5 | 754 |
| 20 | | | 10 | 400 |

Example 2

An inner peripheral surface of a glass tube 15 mm in outside diameter and 285 mm in length was coated with a green-light-emitting phosphor comprising terbium-activated yttrium silicate, with the terbium concentration varied, and luminance measurement was carried out. In this case, lamps were produced for trial by using a gas composition of 90% neon and 10% xenon and fixing the gas pressure at 3.0±0.2 Torr. The results are shown in Table 2.

In the phosphor represented by $aY_2O_3 \cdot bSiO_2:cTb$, the optimum value of c/b is in the range of $0.1 \leq c/b \leq 0.2$, and the normal luminance of the lamp was 6,530 cd/m² for c/b=0.1.

TABLE 2

| c/b | Relative luminance [%] |
| --- | --- |
| 0.05 | 90 |
| 0.1 | 100 |
| 0.2 | 100 |
| 0.3 | 95 |
| 0.4 | 75 |

Example 3

An inner peripheral surface of a glass tube 8 mm in outside diameter and 285 mm in length was coated with a green-light-emitting phosphor comprising terbium-activated yttrium scandium silicate having a chemical composition of $(Y_{0.73}Sc_{0.20}Tb_{0.07})_2SiO_5$, electrodes were fitted to both ends of the glass tube in a sealing manner, and the glass tube was filled with a mixed gas of neon and xenon at a pressure of 0.5 to 10 Torr to produce a lamp. The characteristics of the lamps thus produced were examined by various experiments.

Table 3 shows the experimental results, specifically the lamp characteristics when the neon-xenon mixing ratio and the pressure of the gas filling the glass tube were varied.

Figure 4:
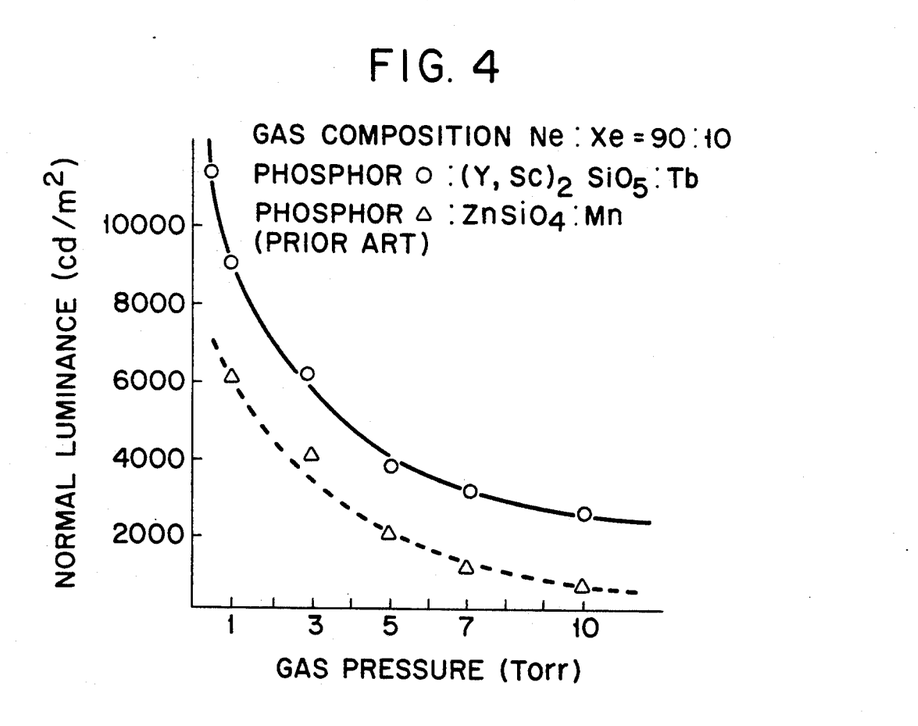
FIG. 4 is a diagram showing the relationship between gas pressure and normal luminance in the case of using $(Y_{0.73}Sc_{0.20}Tb_{0.07})_2SiO_5$ and $ZnSiO_4:Mn$.
Figure 5:
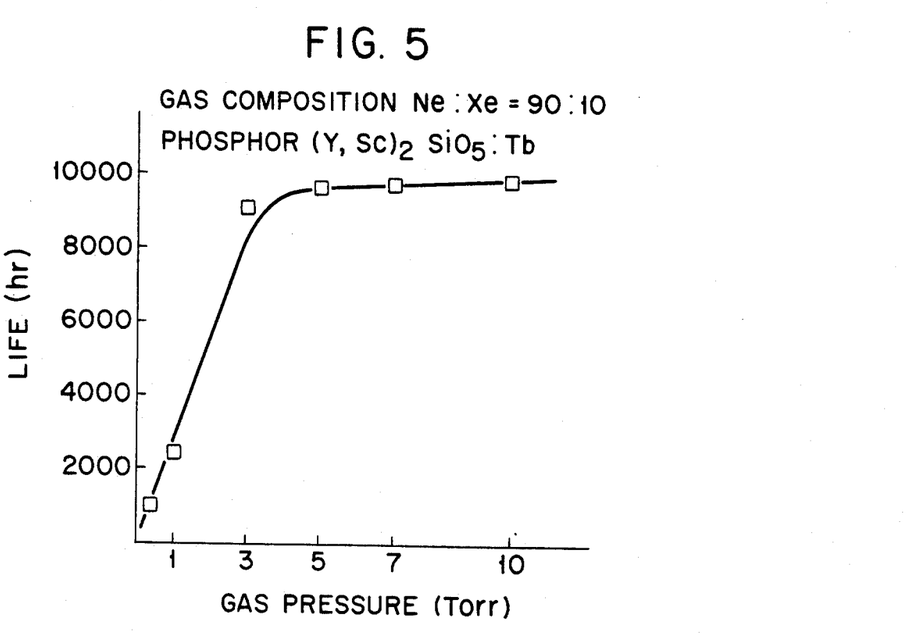
FIG. 5 is a diagram showing the relationship between gas pressure and life in the case where the gas composition is fixed at Ne:Xe=90:10.

FIG. 4 shows the variation of normal luminance with gas pressure, in the case of using the terbium-activated yttrium scandium silicate phosphor $(Y_{0.73}Sc_{0.20}Tb_{0.07})_2SiO_5$ and in the case of using a manganese-activated zinc silicate phosphor, whereas FIG. 5 shows the relationship of life to gas pressure.

As shown in Table 3 and FIG. 4, in the experiments, a lamp filled with a mixed gas of 90% neon and 10% of xenon at a pressure of 3 Torr had a normal luminance of 6,380 cd/m$^2$, which is 1.6 times the luminance obtained by using a conventional $ZnSiO_4$:Mn phosphor, and the life of the lamp was 9,300 hours, as shown in FIG. 5.

Besides, the luminance-temperature characteristic of the lamp was extremely favorable at temperatures of $-20$ to $150°$ C., like that shown in FIG. 3.

TABLE 3

| No. | Gas composition [%] Ne | Gas composition [%] Xe | Gas pressure (Torr) | Normal luminance (cd/m$^2$) |
|---|---|---|---|---|
| 1 | 99 | 1 | 0.5 | 15,700 |
| 2 | | | 1 | 12,300 |
| 3 | | | 3 | 9,000 |
| 4 | | | 5 | 4,670 |
| 5 | | | 10 | 2,100 |
| 6 | 95 | 5 | 0.5 | 15,700 |
| 7 | | | 1 | 11,500 |
| 8 | | | 3 | 8,350 |
| 9 | | | 5 | 4,320 |
| 10 | | | 10 | 1,700 |
| 11 | 90 | 10 | 0.5 | 12,800 |
| 12 | | | 1 | 9,030 |
| 13 | | | 3 | 6,380 |
| 14 | | | 5 | 3,570 |
| 15 | | | 10 | 2,120 |
| 16 | 50 | 50 | 0.5 | 3,500 |
| 17 | | | 1 | 2,700 |
| 18 | | | 3 | 2,050 |
| 19 | | | 5 | 860 |
| 20 | | | 10 | 550 |

Example 4

An inner peripheral surface of a glass tube 15 mm in outside diameter and 285 mm in length was coated with a green-light-emitting phosphor comprising terbium-activated yttrium scandium silicate, with the terbium concentration varied, and luminance measurement was carried out. In this case, lamps were produced for trial by using a gas composition of 50% neon, 40% krypton and 10% of xenon and fixing the gas pressure at $3.0\pm0.2$ Torr. The results are shown in Table 4.

TABLE 4

| d/c | Relative luminance [%] |
|---|---|
| 0.05 | 90 |
| 0.1 | 100 |
| 0.2 | 100 |
| 0.3 | 95 |
| 0.4 | 75 |

In the phosphor represented by $aY_2O_3 \cdot bSc_2O_3 \cdot cSiO_2:dTb$, the optimum value of d/c was in the range of $0.1 \leq d/c \leq 0.2$, and the normal luminance of the lamp was 6,530 cd/m$^2$ for d/c=0.1.

Example 5

An inner peripheral surface of a glass tube 10 mm in outside diameter and 285 mm in length was coated with a green-light-emitting phosphor comprising terbium-activated yttrium scandium silicate, with the scandium concentration varied, to produce lamps for trial, and the luminance of the lamps was measured. In this case, the gas composition was 20% xenon, 30% argon and 50% helium, and the gas pressure was fixed at $1.5\pm0.2$ Torr. The results are shown in Table 5.

In the terbium-activated yttrium scandium silicate phosphor represented by $aY_2O_3 \cdot bSc_2O_3 \cdot cSiO_2:dTb$, the optimum value of b/a was in the range of $0.01 \leq b/a \leq 0.5$, and the normal luminance of the lamp was 6,856 cd/m$^2$ for b/a=0.274.

TABLE 5

| b/a | Chemical composition | Relative luminance [%] |
|---|---|---|
| 0 | $(Y_{0.93}Tb_{0.07})_2SiO_5$ | 100 |
| 0.011 | $(Y_{0.92}Sc_{0.01}Tb_{0.07})_2SiO_5$ | 101.2 |
| 0.033 | $(Y_{0.90}Sc_{0.03}Tb_{0.07})_2SiO_5$ | 101.8 |
| 0.057 | $(Y_{0.88}Sc_{0.05}Tb_{0.07})_2SiO_5$ | 102.3 |
| 0.120 | $(Y_{0.83}Sc_{0.1}Tb_{0.07})_2SiO_5$ | 103.3 |
| 0.274 | $(Y_{0.73}Sc_{0.2}Tb_{0.07})_2SiO_5$ | 104.1 |
| 0.476 | $(Y_{0.63}Sc_{0.3}Tb_{0.07})_2SiO_5$ | 101.0 |
| 0.755 | $(Y_{0.53}Sc_{0.4}Tb_{0.07})_2SiO_5$ | 98.2 |

Example 6

An inner peripheral surface of a glass tube 8 mm in outside diameter and 285 mm in length was coated with a terbium-activated yttrium gadolinium silicate of a chemical composition of $(Y_{0.83}Gd_{0.10}Tb_{0.07})_2SiO_5$, electrodes were fitted to both ends of the glass tube in a sealing manner, and the tube was filled with a mixed gas of neon and xenon at a pressure of 0.5 to 10 Torr to produce a lamp. The characteristics of the lamps thus produced were examined by various experiments.

Table 6 shows the experimental results, specifically the lamp characteristics when the neon-xenon mixing ratio and the pressure of the gas filling the glass tube were varied.

Figure 6:
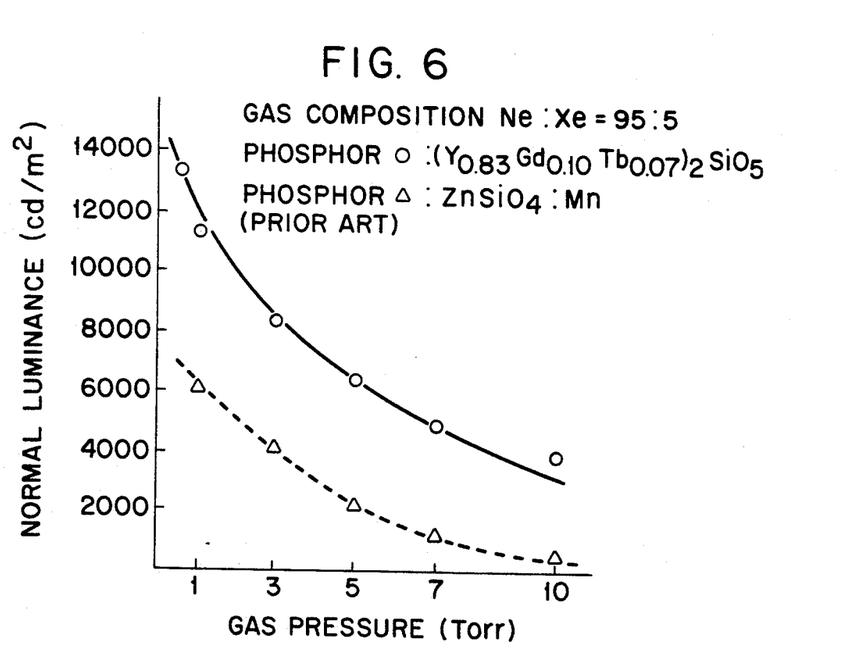
FIG. 6 is a diagram showing the relationship between gas pressure and normal luminance in the case of using $(Y_{0.83}Gd_{0.10}Tb_{0.07})_2SiO_5$ and $ZnSiO_4:Mn$.
Figure 7:
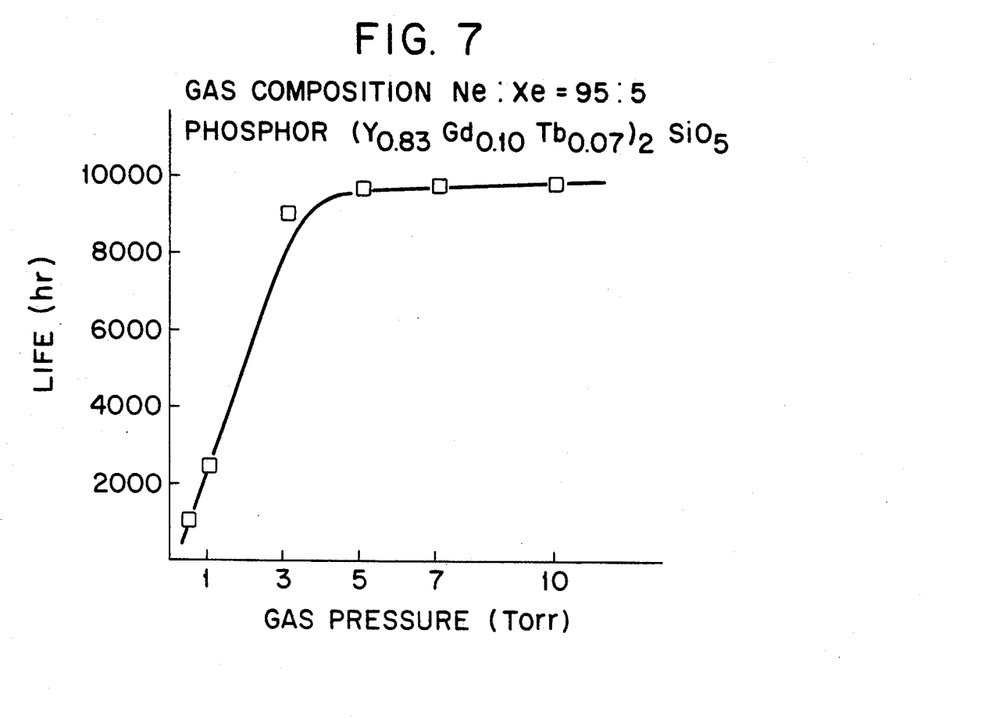
FIG. 7 is a diagram showing the relationship between gas pressure and luminance in the case where the gas composition is fixed at Ne:Xe=95:5.

FIG. 6 shows the variation of normal luminance with gas pressure, in the case of using the terbium-activated yttrium gadolinium silicate phosphor $(Y_{0.83}Gd_{0.10}Tb_{0.07})_2SiO_5$ and in the case of using a manganese-activated zinc silicate phosphor, whereas FIG. 7 shows the relationship of life to gas pressure.

As shown in Table 6 and FIG. 6, in the experiments, a lamp filled with a mixed gas of 95% neon and 5% xenon at a pressure of 2.5 Torr had a normal luminance of 7,960 cd/m$^2$, which is 1.7 times the luminance obtained by using a conventional $ZnSiO_4$:Mn phosphor, and the life of the lamp was 9,500 hours, as shown in FIG. 7.

Besides, the luminance-temperature characteristic was extremely favorable at temperatures of $20°$ to $150°$ C., like that shown in FIG. 3.

TABLE 6

| No. | Gas composition [%] Ne | Gas composition [%] Xe | Gas pressure (Torr) | Normal luminance (cd/m$^2$) |
|---|---|---|---|---|
| 1 | 99 | 1 | 0.5 | 16,700 |
| 2 | | | 1 | 14,300 |
| 3 | | | 3 | 9,600 |
| 4 | | | 5 | 5,300 |
| 5 | | | 10 | 4,050 |
| 6 | 95 | 5 | 0.5 | 15,000 |
| 7 | | | 1 | 12,050 |
| 8 | | | 3 | 9,000 |
| 9 | | | 5 | 5,450 |
| 10 | | | 10 | 2,830 |
| 11 | 90 | 10 | 0.5 | 13,000 |

TABLE 6-continued

| No. | Gas composition [%] Ne | Gas composition [%] Xe | Gas pressure (Torr) | Normal luminance (cd/m$^2$) |
|---|---|---|---|---|
| 12 |    |    | 1   | 9,500 |
| 13 |    |    | 3   | 7,080 |
| 14 |    |    | 5   | 4,050 |
| 15 |    |    | 10  | 3,050 |
| 16 | 50 | 50 | 0.5 | 9,800 |
| 17 |    |    | 1   | 7,030 |
| 18 |    |    | 3   | 5,920 |
| 19 |    |    | 5   | 3,850 |
| 20 |    |    | 10  | 2,970 |

Example 7

An inner surface of a glass tube 8 mm in outside diameter and 250 mm in length was coated with a terbium-activated yttrium gadolinium silicate phosphor, with the terbium concentration varied, and luminance measurement was carried out. In this case, the lamps were produced for trial by using a gas composition of 15% xenon, 60% argon and 25% krypton and fixing the gas pressure at $1.0\pm0.1$ Torr. The results are shown in Table 7.

TABLE 7

| d/c | Relative luminance [%] |
|---|---|
| 0.05 | 90 |
| 0.1  | 100 |
| 0.2  | 100 |
| 0.3  | 97 |
| 0.4  | 83 |

In a phosphor represented by $aY_2O_3.bBd_2O_3.cSiO_2:dTb$, the optimum value of d/c was in the range of $0.1 \leq d/c \leq 0.2$, and the normal luminance of the lamp was 8,350 cd/m$^2$ for d/c=0.15.

Example 8

An inner peripheral surface of a glass tube 10 mm in outside diameter and 255 mm in length was coated with a terbium-activated yttrium gadolinium silicate green-light-emitting phosphor, with the gadolinium concentration varied, to produce a lamp for trial, and the luminance of the lamp was measured. In this case, the lamps were produced by using a gas composition of 95% neon and 5% xenon and fixing the gas pressure at $0.5\pm0.05$ Torr.

The results are shown in Table 8. In a terbium-activated gadolinium yttrium silicate phosphor represented by $aY_2O_3.bGd_2O_3.cSc_2O_3:dTb$, the optimum value of gadolinium is in the range of $0.1 \leq b/a \leq 0.70$, and the normal luminance of the lamp is 12,350 cd/m$^2$ for b/a=0.120.

TABLE 8

| b/a | Chemical composition | Relative luminance [%] |
|---|---|---|
| 0     | $(Y_{0.93}Tb_{0.07})_2SiO_5$ | 100 |
| 0.011 | $(Y_{0.92}Gd_{0.01}Tb_{0.07})_2SiO_5$ | 101.5 |
| 0.033 | $(Y_{0.90}Gd_{0.03}Tb_{0.07})_2SiO_5$ | 101.9 |
| 0.057 | $(Y_{0.88}Gd_{0.05}Tb_{0.07})_2SiO_5$ | 102.8 |
| 0.120 | $(Y_{0.83}Gd_{0.1}Tb_{0.07})_2SiO_5$ | 103.9 |
| 0.274 | $(Y_{0.73}Gd_{0.2}Tb_{0.07})_2SiO_5$ | 103.5 |
| 0.476 | $(Y_{0.63}Gd_{0.3}Tb_{0.07})_2SiO_5$ | 102.0 |
| 0.755 | $(Y_{0.53}Gd_{0.4}Tb_{0.07})_2SiO_5$ | 99.5 |

Example 9

An inner peripheral surface of a glass tube 8 mm in outside diameter and 150 mm in length was coated with a terbium-activated yttrium silicate phosphor, individually containing boron, phosphorus or aluminum. Such glass tubes were filled with a gas of a composition of 10% xenon, 40% neon and 50% argon at a pressure of $0.7\pm0.02$ Torr to produce lamps for trial.

Measurement results of the luminance of the lamps thus produced are shown in Table 9. As shown, similar effects on improvement of luminance were obtained when part of silicon was replaced by boron, phosphorus or aluminum.

TABLE 9

| No. | Chemical composition | Relative luminance [%] |
|---|---|---|
| 1 | $(Y_{0.93}Tb_{0.07})_2SiO_5$ | 100 |
| 2 | $(Y_{0.93}Tb_{0.07})_2O_3.0.95SiO_2.0.025B_2O_3$ | 101.3 |
| 3 | $(Y_{0.93}Tb_{0.07})_2O_3.0.90SiO_2.0.05B_2O_3$ | 102.5 |
| 4 | $(Y_{0.93}Tb_{0.07})_2O_3.0.98SiO_2.0.001P_2O_5$ | 101.1 |
| 5 | $(Y_{0.93}Tb_{0.07})_2O_3.0.95SiO_2.0.025P_2O_5$ | 102.3 |
| 6 | $(Y_{0.93}Tb_{0.07})_2O_3.0.99SiO_2.0.0005AL_2O_3$ | 103.1 |
| 7 | $(Y_{0.93}Tb_{0.07})_2O_3.0.98SiO_2.0.001AL_2O_3$ | 103.3 |
| Prior art | $Zn_2SiO_4$ | 55.0 |

Figure 8:
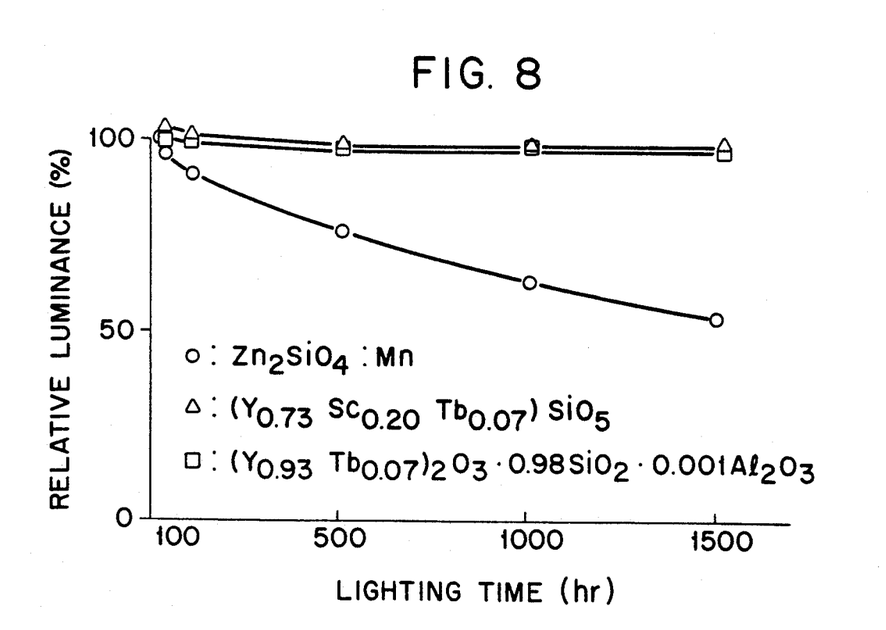
FIG. 8 is a diagram showing the relationship of lumen maintenance factor during lighting in the case of using $(Y_{0.93}Tb_{0.07})_2O_3 \cdot 0.98SiO_2 \cdot 0.001Al_2O_3$, $(Y_{0.73}Sc_{0.20}Tb_{0.07})_2 SiO_5$ and $ZnSiO_4:Mn$.

FIG. 8 shows the deterioration of luminous intensity (lumen maintenance factor) during lighting of the lamps produced by using the terbium-activated yttrium scandium silicate phosphor $(Y_{0.73}Sc_{0.20}Tb_{0.07})_2SiO_5$ described in Example 3, the terbium-activated yttrium aluminum silicate phosphor represented by $(Y_{0.93}Tb_{0.07})_2O_3.0.98SiO_2.0.001Al_2O_3$ in Example 9 and a conventional manganese-activated zinc silicate phosphor $(Zn_2SiO_4:Mn)$, respectively.

As is clear from FIG. 8, the lamps according to the examples of this invention have a lumen maintenance factor after 1,500 hours of lighting of 97 to 98%, as contrasted to 53% of the lamp according to the prior art. Thus, it is seen that the lamps according to this invention show marked improvements in deterioration of luminous intensity, as compared with the lamp according to the prior art.

Though FIG. 8 shows the lumen maintenance factor for only two of the above examples, similar results have been obtained with the green-light-emitting phosphors according to the other examples.

Besides, though the lamps according to the above examples are the so-called rare gas discharge lamps in which mercury is not used as an excitation source for the phosphor but vacuum ultraviolet rays emitted by the rare gas are used, no effects of differences in the phosphor on instantaneous lighting were observed, and the lamps have been confirmed to have characteristics comparable to those of the lamps according to the prior art.

INDUSTRIAL APPLICABILITY

As has been described above, the green-light-emitting rare gas discharge lamp according to this invention shows enhanced luminous efficacy, such as luminance and color of light, while maintaining the characteristic features of rare gas discharge, such as less deterioration of luminous intensity and less temperature dependency during lighting as well as capability of instantaneous lighting. Therefore, the green-light-emitting rare gas discharge lamp of this invention is suitable for use as a green-light-emitting light source for office automation equipment with high reliability.

What is claimed is:

1. A green-light-emitting rare gas discharge lamp comprising a glass tube filled with a rare gas capable of emitting vacuum ultraviolet rays of a wavelength of not more than 200 nm, and a layer of a phosphor provided on an inner surface of the glass tube, the phosphor emitting green light when irradiated with the vacuum ultraviolet rays, wherein;

the rare gas comprises at least one selected from the group consisting of xenon, neon, helium, argon and krypton, and the green-light-emitting phosphor comprises terbium-activated yttrium silicate.

2. A green-light-emitting rare gas discharge lamp as set forth in claim 1, wherein the green-light-emitting phosphor is a terbium-activated yttrium silicate phosphor comprising at least one element selected from the group consisting of boron, aluminum, phosphorus, scandium and the lanthanum series elements.

3. A green-light-emitting rare gas discharge lamp as set forth in claim 2, wherein the green-light-emitting phosphor is a terbium-activated yttrium scandium silicate.

4. A green-light-emitting rare gas discharge lamp as set forth in claim 2, wherein the green-light-emitting phosphor is a terbium-activated yttrium gadolinium silicate.

5. A green-light-emitting rare gas discharge lamp as set forth in claim 1, wherein a main peak in intensity of said emitted green light occurs at a wavelength of about 540 nm.

6. A green-light-emitting rare gas discharge lamp as set forth in claim 1, wherein the phosphor is essentially composed of terbium-activated yttrium silicate phosphor and the rate gas is a mixed gas essentially composed of neon and xenon.

7. A green-light-emitting rare gas discharge lamp as set forth in claim 1, wherein the phosphor is essentially composed of a terbium-activated yttrium scandium silicate phosphor and the rare gas is a mixed gas essentially composed of neon and xenon.

8. A green-light-emitting rare gas discharge lamp as set forth in claim 1, wherein the phosphor is essentially composed of a terbium-activated yttrium scandium silicate and the rare gas is a mixed gas essentially composed of neon, krypton and xenon.

9. A green-light-emitting rare gas discharge lamp as set forth in claim 1, wherein the phosphor is essentially composed of a terbium-activated yttrium scandium silicate and the rare gas is a mixed gas essentially composed of xenon, argon and helium.

10. A green-light-emitting rare gas discharge lamp as set forth in claim 1, wherein the phosphor is essentially composed of a terbium-activated yttrium gadolinium silicate and the rare gas is a mixed gas essentially composed of neon and xenon.

11. A green-light-emitting rare gas discharge lamp as set forth in claim 1, wherein the phosphor is essentially composed of a terbium-activated yttrium gadolinium silicate phosphor and the rare gas is a mixed gas essentially composed of xenon, argon and krypton.

12. A green-light-emitting rare gas discharge lamp as set forth in claim 1, wherein the phosphor is essentially composed of a terbium-activated yttrium silicate phosphor comprising at least one selected from the group consisting of boron, phosphorous, and aluminum and the rare gas is a mixed gas essentially composed of xenon, neon, and argon.

* * * * *

UNITED STATES PATENT AND TRADEMARK OFFICE
CERTIFICATE OF CORRECTION

PATENT NO. : 5,159,237

DATED : October 27, 1992

INVENTOR(S) : Kazutoshi ISHIKAWA et al

It is certified that error appears in the above-identified patent and that said Letters Patent is hereby corrected as shown below:

Title page, under Related U.S. Application Data item [63], delete "PCT/JP88/00798" and insert -- PCT/JP88/00788 --.

Signed and Sealed this

Twenty-eighth Day of September, 1993

Attest:

BRUCE LEHMAN

Attesting Officer    Commissioner of Patents and Trademarks